US009957855B2

(12) United States Patent
Tripp et al.

(10) Patent No.: US 9,957,855 B2
(45) Date of Patent: May 1, 2018

(54) WINDOWED INTAKE VALVE STEM

(71) Applicant: DENSO International America, Inc., Southfield, MI (US)

(72) Inventors: Steve D. Tripp, Howell, MI (US); Rachel E. Chao, Birmingham, MI (US)

(73) Assignee: DENSO International America, Inc., Southfield, MI (US)

( * ) Notice: Subject to any disclaimer, the term of this patent is extended or adjusted under 35 U.S.C. 154(b) by 14 days.

(21) Appl. No.: 15/165,558

(22) Filed: May 26, 2016

(65) Prior Publication Data

US 2017/0342873 A1    Nov. 30, 2017

(51) Int. Cl.
  *F01L 3/02*   (2006.01)
  *F01L 3/20*   (2006.01)
  *F01L 3/06*   (2006.01)
  *F01L 3/16*   (2006.01)
  *F01L 3/08*   (2006.01)

(52) U.S. Cl.
  CPC . *F01L 3/20* (2013.01); *F01L 3/02* (2013.01); *F01L 3/06* (2013.01); *F01L 3/08* (2013.01); *F01L 3/16* (2013.01)

(58) Field of Classification Search
  CPC ....... F01L 3/02; F01L 3/20; F01L 3/06; F02L 3/16
  USPC ....................................... 123/188.2
  See application file for complete search history.

(56) References Cited

U.S. PATENT DOCUMENTS

| 5,551,392 A | 9/1996 | Yamaji et al. |
| 5,915,354 A | 6/1999 | Ma |
| 6,138,616 A * | 10/2000 | Svensson ................. F01L 3/24 |
| | | 123/188.2 |
| 6,516,765 B1 | 2/2003 | Becker, Jr. |
| 2011/0168123 A1 | 7/2011 | Kerr |

* cited by examiner

*Primary Examiner* — Jacob Amick
*Assistant Examiner* — Charles Brauch
(74) *Attorney, Agent, or Firm* — Harness, Dickey & Pierce, P.L.C.

(57) ABSTRACT

An intake valve for an internal combustion engine is provided. The intake valve includes a valve stem with a hole in the valve stem forming an air channel there through that allows intake air to flow from an intake passage, through the air channel, into a cylinder of the internal combustion engine.

15 Claims, 4 Drawing Sheets

WINDOWED INTAKE VALVE STEM

FIELD

The present disclosure relates to intake valves for internal combustion engines and, more particularly, to intake valves having a windowed valve stem.

BACKGROUND

This section provides background information related to the present disclosure, which is not necessarily prior art.

To increase fuel efficiency and reduce emissions for an internal combustion engine, it is beneficial to maximize in-cylinder combustion by optimizing the mixing of air and fuel in the cylinder to ensure that complete combustion occurs in the cylinder. Although systems exist with modifications to the geometry of the intake airway and the structure of the valve head, such systems generally utilize standard valve stems and are subject to improvement.

SUMMARY

This section provides a general summary of the disclosure, and is not a comprehensive disclosure of its full scope or all of its features.

The present teachings include systems and methods for an intake valve of an internal combustion engine. The intake valve includes a valve stem with a hole in the valve stem forming an air channel there through that allows intake air to flow from an intake passage, through the air channel, into a cylinder of the internal combustion engine.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
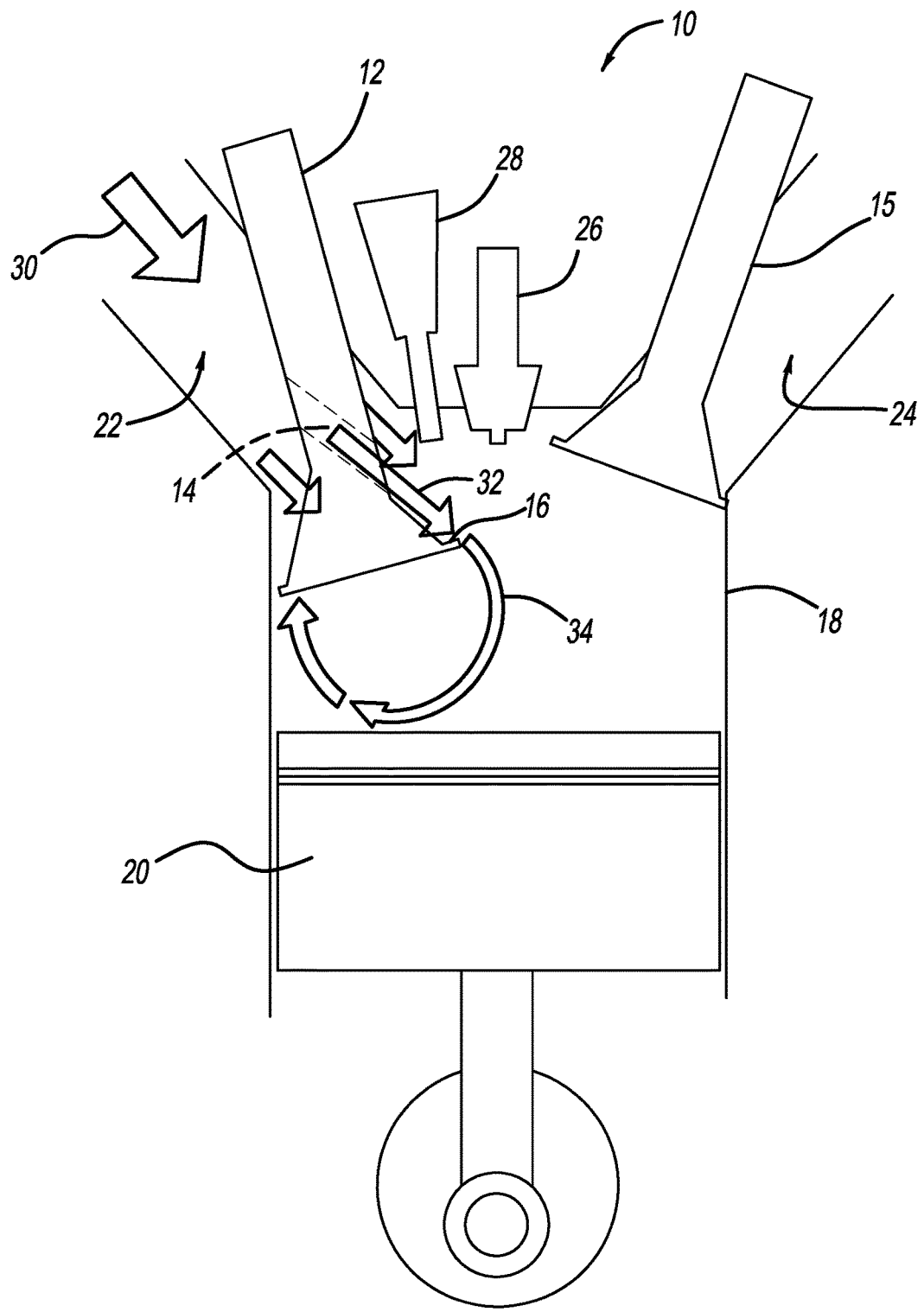
FIG. 1 illustrates a cross-section of an internal combustion engine system utilizing an intake valve with a windowed valve stem.

With reference to FIG. 1, an internal combustion engine system 10 according to the present teachings is illustrated and includes a cylinder 18 and piston 20 positioned within a bore of the cylinder 18. The system 10 includes an intake valve 12 and an exhaust valve 15. In operation, the intake valve 12 selectively seals an air intake passage 22 to selectively allow and block the flow of intake air 30 into the cylinder 18. For example, as shown in FIG. 1, the intake valve 12 is illustrated in an open position, thereby allowing intake air 30 to flow into the cylinder 18. The intake valve 12 is then retracted to seal off the intake passage 22 to prevent intake air 30 from flowing into the cylinder 18.

The air in the cylinder is mixed with fuel injected into the cylinder by a fuel injector 28. With both the intake valve 12 and the exhaust valve 15 closed, the mixture of fuel and air is prevented from exiting the cylinder 18. The mixture of fuel and air is ignited by a spark plug 26 and the resulting combustion drives the piston 20 in the cylinder 18, and a connected connecting rod, to turn, for example, a crankshaft of the internal combustion system 10.

Exhaust from the combustion exits the cylinder 18 through an exhaust passage 24 that is selectively sealed by the exhaust valve 15. For example, as shown in FIG. 1, the exhaust valve 15 is shown in a retracted or closed position, which prevents the mixture of fuel and air from exiting the cylinder 18 into the exhaust passage 24. After the combustion, the exhaust valve 15 is opened and the exhaust from the combustion exits the cylinder 18 through the exhaust passage 24. The cycle then starts anew with the intake valve 12 opening to allow intake air 30 to flow into the cylinder 18.

The intake valve 12 can include a lip 16 located at an edge of the valve head of the intake valve 12. The lip 16, for example, can encircle a circumference of the valve head of the intake valve 12. The lip 16 can assist in sealing off the intake passage 22 by engaging with an edge of the intake passage 22 when the intake valve 12 is in the retracted or closed position.

As shown in FIG. 1, the intake valve 12 includes an aperture or hole 14 in the valve stem of the intake valve 12. In other words, the intake valve 12 has a windowed valve stem in the sense that the valve stem of the intake valve 12 has the aperture or hole 14 extending there through. The hole 14 forms an air channel through the valve stem that allows air 32 to flow through the interior of the air channel in the valve stem from the intake passage 22 to the cylinder 18. In other words, intake air 30 from the intake passage 22 can enter the hole 14 and flow through the air channel formed by the hole 14 and exit the air channel into the interior bore of the cylinder 18. A cross-section of the hole 14 is shown in FIG. 1, with the resulting air channel formed by the hole 14 through the valve stem of the intake valve 12 shown with dashed lines.

Figure 2A:
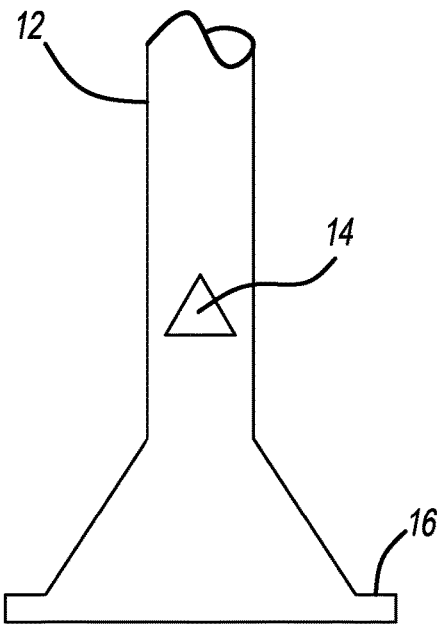
FIG. 2A illustrates a front view of an intake valve with a windowed valve stem having a triangular shaped aperture.
Figure 2B:
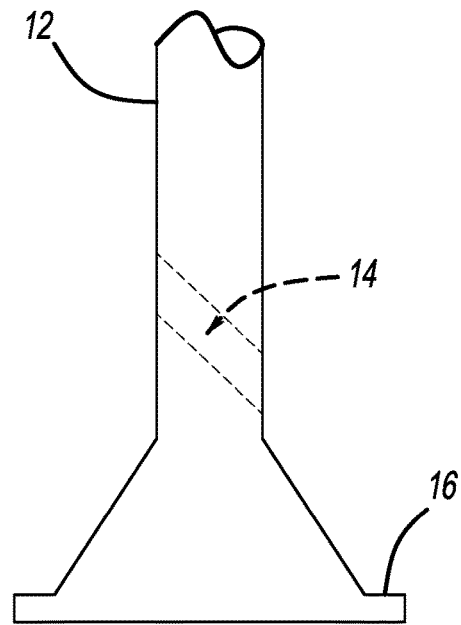
FIG. 2B illustrates a side view of the intake valve of FIG. 2A, with an air channel through the valve stem shown with dashed lines.

As shown in FIG. 2A, the hole 14 can be formed with a triangular shape. A front view of the intake valve with the hole 14 in the valve stem is shown in FIG. 2A. A corresponding side view, showing a cross-section of the hole 14 and the resulting channel formed by the hole 14 through the valve stem of the intake valve 12 illustrated with dashed lines, is shown in FIG. 2B.

Figure 3A:
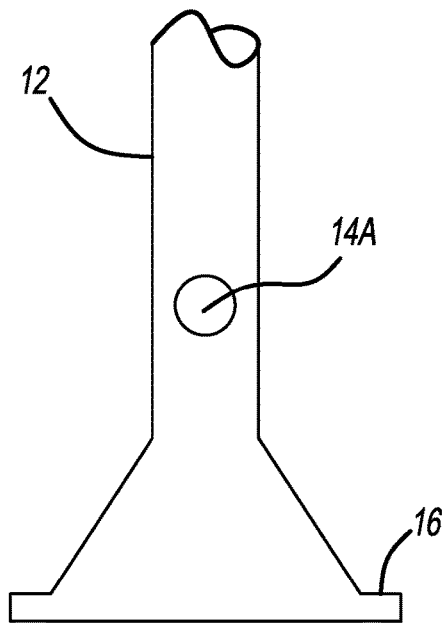
FIG. 3A illustrates a front view of an intake valve with a windowed valve stem having a circular shaped aperture.
Figure 3B:
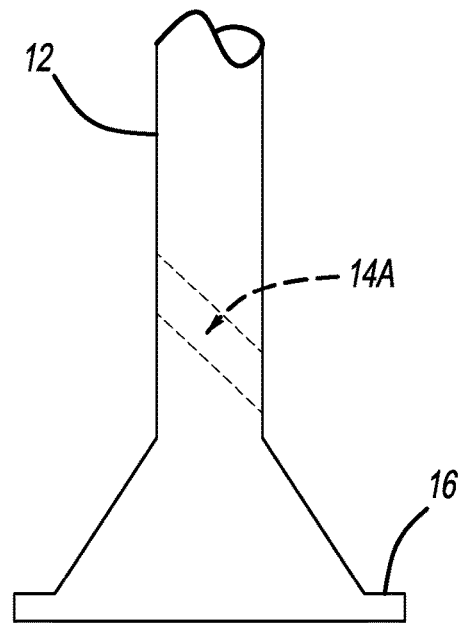
FIG. 3B illustrates a side view of the intake valve of FIG. 3A, with an air channel through the valve stem shown with dashed lines.
Figure 4A:
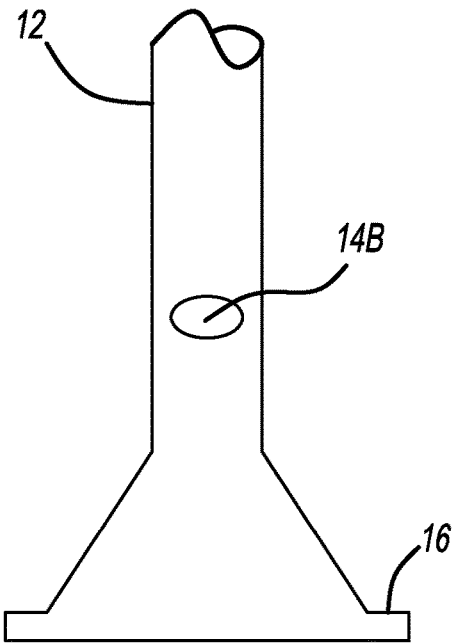
FIG. 4A illustrates a front view of an intake valve with a windowed valve stem having an oval shaped aperture.
Figure 4B:
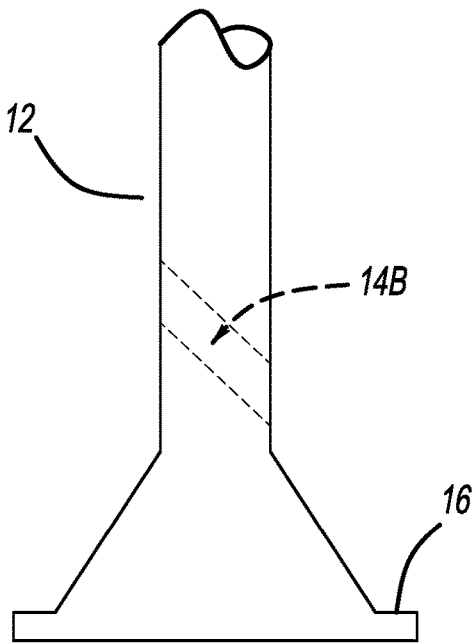
FIG. 4B illustrates a side view of the intake valve of FIG. 4A, with an air channel through the valve stem shown with dashed lines.
Figure 5A:
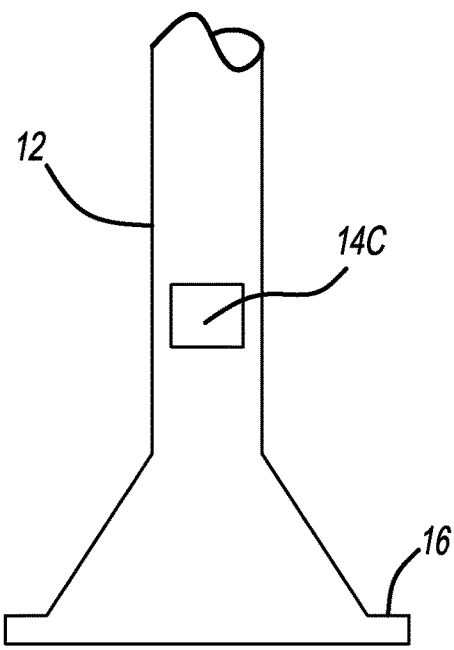
FIG. 5A illustrates a front view of an intake valve with a windowed valve stem having a square shaped aperture.
Figure 5B:
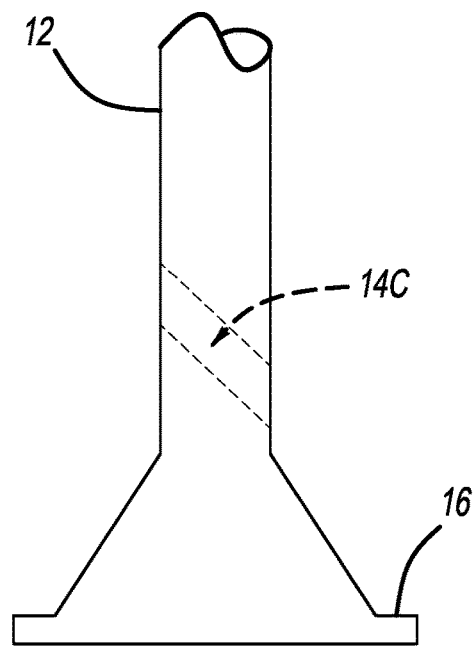
FIG. 5B illustrates a side view of the intake valve of FIG. 5A, with an air channel through the valve stem shown with dashed lines.
Figure 6A:
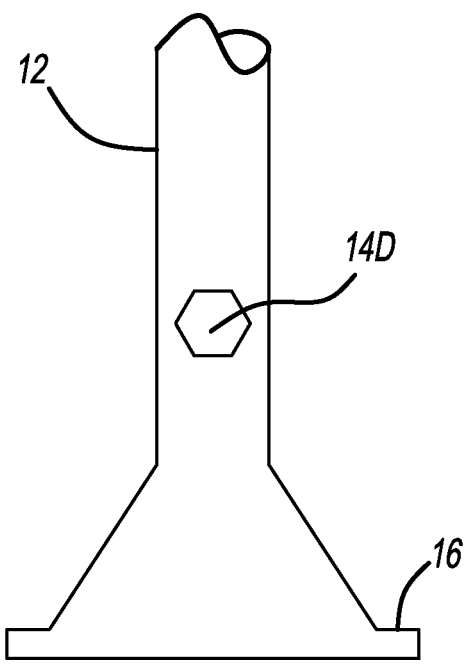
FIG. 6A illustrates a front view of an intake valve with a windowed valve stem having a hexagon shaped aperture.
Figure 6B:
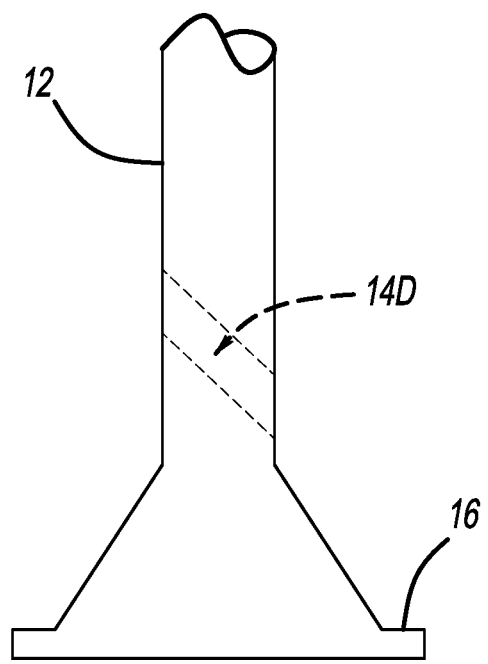
FIG. 6B illustrates a side view of the intake valve of FIG. 6A, with an air channel through the valve stem shown with dashed lines.

While the hole 14 is shown in FIG. 2A as having a triangular shape, the hole 14 can alternatively be formed in any shape. For example, as shown in FIG. 3A, the hole 14A is shown having a circular shape. Specifically, FIG. 3A illustrates a front view of the intake valve with the hole 14A in the valve stem having a circular shape and FIG. 3B illustrates a side view, showing a cross-section of the hole 14A and the resulting channel formed by the hole 14A through the valve stem of the intake valve 12 illustrated with dashed lines. For further example, as shown in FIG. 4A, the hole 14B is shown having an oval shape. Specifically, FIG. 4A illustrates a front view of the intake valve with the hole 14B in the valve stem having an oval shape and FIG. 4B illustrates a side view, showing a cross-section of the hole 14B and the resulting channel formed by the hole 14B through the valve stem of the intake valve 12 illustrated with dashed lines. For further example, as shown in FIG. 5A, the hole 14C is shown having a square shape. Specifically, FIG. 5A illustrates a front view of the intake valve with the hole 14C in the valve stem having a square shape and FIG. 5B illustrates a side view, showing a cross-section of the hole 14C and the resulting channel formed by the hole 14C through the valve stem of the intake valve 12 illustrated with dashed lines. For example, as shown in FIG. 6A, the hole 14D is shown having a hexagon shape. Specifically, FIG. 6A illustrates a front view of the intake valve with the hole 14D in the valve stem having a hexagon shape and FIG. 6B illustrates a side view, showing a cross-section of the hole 14D and the resulting channel formed by the hole 14D through the valve stem of the intake valve 12 illustrated with dashed lines. While FIGS. 2A through 6A show various shapes for the hole 14, 14A, 14B, 14C, 14D through the valve stem of the intake valve 12, any other regular or irregular shape or variation of a shape of the hole and resulting air channel can be used.

With reference again to FIG. 1, the air channel formed by the hole 14 through the valve stem of the intake valve 12 can be configured to be parallel with the intake passage 22. In other words, an axis of the air channel formed by the hole 14 through the valve stem of the intake valve 12 may be configured and positioned to be parallel with an axis formed by the intake passage 22 and with an axis of the flow of intake air 30 within the intake passage 22. In this way, intake air 30 can enter the hole 14 with minimal resistance or friction encountered due to the structure of the intake valve 12.

Additionally, the channel formed by the hole 14 through the valve stem of the intake valve 12 can be configured so that air 32 exiting the air channel formed by the hole is directed at the lip 16. As shown in FIG. 1, intake air 30 from the intake passage 22 flows into the hole 14 and flows through the air channel formed by the hole 14. Further, air 32 exiting the air channel is directed at the lip 16 of the valve head of the intake valve 12. As shown in FIG. 1, directing air 32 at the lip 16 of the valve head of the intake valve 12 results in a tumble motion, illustrated by the motion of air 34. In this way, directing air 32 from the channel formed by the hole 14 at the lip 16 of the valve head results in increased tumble motion and increased turbulence of the air flow in the bore of the cylinder 18. The increased tumble motion and increased turbulence of the air flow ensures a more consistent and complete mixture of the air and fuel in the cylinder 18 and results in more complete combustion of the air and fuel mixture in the cylinder 18. In addition, the more complete combustion of the air and fuel mixture beneficially results in increased fuel efficiency and reduced emissions for the internal combustion engine system 10.

As shown in FIGS. 1 and 2B to 6B, the air channel formed by the hole 14, 14A, 14B, 14C, 14D through the valve stem of the intake valve 12 is angled such that the hole of the air channel on the air entry side of the valve stem is higher on the valve stem than the hole of the channel on the air exit side of the valve stem, relative to the valve head of the intake valve 12. For example, the angle of the air channel formed by the hole 14 through the intake valve 12 can be from fifteen degrees to forty-five degrees, relative to an axis of the valve head of the intake valve. Alternatively, other angles for the channel formed by the hole 14 through the intake valve 12 can be used. In this way, air 32 exiting the air channel formed by the hole is directed at the lip 16 of the valve head of the intake valve 12.

When installed in the intake passage 22 and/or cylinder 18, the intake valve 12 must be properly positioned so that the hole of the air channel on the air entry side of the valve stem is aligned with the intake passage 22 and the hole of the air channel on the air exit side of the valve stem is aligned with the cylinder. Further, the intake valve 12 must be properly positioned so that the air channel is parallel with the intake passage 22. To ensure proper positioning, the intake valve 12 may be configured with a notch or boss that aligns and engages with a corresponding boss or notch, respectively, of the internal combustion engine system 10. In this way, the intake valve 12 can be properly positioned so that the air channel formed by the hole 14 in the intake valve allows air 32 to flow from the intake passage 22 into the bore of the cylinder 18.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
an intake valve for an internal combustion engine, the intake valve having a valve stem with a hole in the valve stem forming an air channel there through that allows intake air to flow from an intake passage, through the air channel, into a cylinder of the internal combustion engine, wherein
an axis of the air channel through the valve stem is parallel with an axis of the intake passage.

2. The system of claim 1, wherein the air channel directs air flowing through the air channel towards a lip on a valve head of the intake valve.

3. The system of claim 1, wherein the hole has a triangular shape.

4. The system of claim 1, wherein the hole has a circular shape.

5. The system of claim 1, wherein the hole has an oval shape.

6. The system of claim 1, wherein the hole has a square shape.

7. The system of claim 1, wherein the hole has a hexagon shape.

8. An internal combustion engine system comprising:
a piston positioned within a bore of a cylinder;
an intake valve that selectively seals an air intake passage to allow and block a flow of intake air from the intake passage into the cylinder, the intake valve having a valve stem with a hole in the valve stem forming an air channel there through that allows intake air to flow from the intake passage, through the air channel, into the cylinder, wherein
an axis of the air channel through the valve stem is parallel with an axis of the intake passage.

9. The internal combustion engine system of claim 8, wherein the air channel directs air flowing through the air channel towards a lip on a valve head of the intake valve.

10. The internal combustion engine system of claim 8, wherein the hole has a triangular shape.

11. The internal combustion engine system of claim 8, wherein the hole has a circular shape.

12. The internal combustion engine system of claim 8, wherein the hole has an oval shape.

13. The internal combustion engine system of claim 8, wherein the hole has a square shape.

14. The internal combustion engine system of claim 8, wherein the hole has a hexagon shape.

15. A method comprising:
directing air, with an intake valve of an internal combustion engine, from an intake passage towards a lip of a valve head of the intake valve using a hole in a valve stem of the intake valve that forms an air channel through the valve stem of the intake valve, wherein
an axis of the air channel through the valve stem is parallel with an axis of the intake passage.

* * * * *